US 6,662,078 B1

(12) United States Patent
Hardgrave et al.

(10) Patent No.: US 6,662,078 B1
(45) Date of Patent: Dec. 9, 2003

(54) SYSTEM AND METHOD FOR ITEM MANAGEMENT VIA AN ELECTRONIC COMMUNICATION NETWORK

(76) Inventors: William David Hardgrave, 1933 Westminster, Carrollton, TX (US) 75007; Lanna Kay Hardgrave, 1933 Westminster, Carrollton, TX (US) 75007

(*) Notice: Subject to any disclaimer, the term of this patent is extended or adjusted under 35 U.S.C. 154(b) by 0 days.

(21) Appl. No.: 10/178,999

(22) Filed: Jun. 25, 2002

Related U.S. Application Data

(60) Provisional application No. 60/325,440, filed on Sep. 28, 2001, and provisional application No. 60/300,846, filed on Jun. 25, 2001.

(51) Int. Cl.[7] .............................. G06F 7/00; G06F 17/60
(52) U.S. Cl. .............................. 700/226; 700/229; 705/5
(58) Field of Search ............................... 700/213, 225, 700/226, 228, 229; 705/5, 28

(56) References Cited

U.S. PATENT DOCUMENTS

| | | | | |
|---|---|---|---|---|
| 5,866,888 A | * | 2/1999 | Bravman et al. | 235/375 |
| 6,119,096 A | * | 9/2000 | Mann et al. | 705/5 |
| 6,222,452 B1 | * | 4/2001 | Ahlstrom et al. | 340/572.1 |
| 6,259,367 B1 | * | 7/2001 | Klein | 340/572.1 |
| 6,476,718 B1 | * | 11/2002 | Cartwright et al. | 340/572.1 |
| 6,496,806 B1 | * | 12/2002 | Horwitz et al. | 705/28 |
| 6,512,478 B1 | * | 1/2003 | Chien | 342/357.09 |
| 6,512,964 B1 | * | 1/2003 | Quackenbush et al. | 700/226 |

OTHER PUBLICATIONS http://www.ti.com/tiris/docs/news/news_releases/2000/rel08-29-00.shtml, "Baggage Direct Goes Live With the World's First RFIN-based Baggage Delivery system." Aug. 29, 2000.*

* cited by examiner

Primary Examiner—Gene O. Crawford
(74) Attorney, Agent, or Firm—Stephen J. Wyse

(57) ABSTRACT

A system and method for item tracking and management. A marking tag is affixed to each item to be tracked, such as articles of commercial airline passenger luggage, so that it can be read as items enter and leave the system through which they are actively managed. The marking tag bears unique identifying information that in a central registration database is associated with the person to which the item (or items) belongs. The marking tag may also bear additional information about the owner or the about the article itself. Each time the owner checks the item, the time and place of checking is noted in the registration database. A historical record of places the item has been checked is kept and may be used for identifying passengers, baggage or situations that may require greater scrutiny by security personnel. A check-out station is provided to monitor the return of items to their respective owners, and a lost item return system aids in the recovery of lost items.

31 Claims, 6 Drawing Sheets

SYSTEM AND METHOD FOR ITEM MANAGEMENT VIA AN ELECTRONIC COMMUNICATION NETWORK

RELATED APPLICATIONS

This Application is related to, and claims the benefit of the filing dates of U.S. Provisional Patent Application No. 60/300,846, filed Jun. 25, 2001, and U.S. Provisional Patent Application No. 60/325,440, filed Sep. 28, 2001, and is also related to issued U.S. Pat. No. 6,010,239, issued Jan. 4, 2000, all of which are incorporated herein by reference.

TECHNICAL FIELD OF THE INVENTION

The present invention relates to item tracking and management, and more specifically to a system and method of providing greater reliability, security, and convenience using an automated item tracking system for the management of items, for example airline passenger baggage, through a publically-accessible electronic communications network such as the Internet.

BACKGROUND OF THE INVENTION

The need to keep track of—to track—a variety of different items in a secure, organized, and logical manner has been steadily increasing in a variety of situations. Once a convenience or optional customer service, item tracking and management will become increasingly valuable in a number of different contexts. One such context is the tracking of airline passenger baggage. Note that although the present invention is described in this context, however, the system and method of the present invention will be advantageously applicable in a number of other scenarios as well.

Millions of passengers board commercial airliners each year, many of them accompanied by one or more pieces of luggage. Some of these items the passenger chooses to "carry-on", that is, to bring with them into the airliner passenger cabin. Other luggage is "checked", or given to an airline representative to be stowed in a cargo-only compartment of the plane on which the passenger is flying. For security reasons, the contents of a carry-on bag are usually examined before the passenger boards the airplane. This examination may be performed by X-ray or by direct visual examination. While the number of permissible carry-on bags is often limited to prevent over-congestion, there is generally no other management of carry-on luggage, and its presence is rarely tracked or recorded anywhere.

Checked luggage is often examined as well, although generally not with the same degree of scrutiny as carry-on luggage due to the cost and delay of doing so, but knowing that it will not ordinarily be accessible from the passenger cabin. When handed over by a passenger, it is normally weighed, labeled, and exchanged for a claim check that may later be required to demonstrate ownership of the bag. The weight of the bag, or at least the collective weight of the bags belonging to all of the passengers, is recorded because it will be needed for load and balance calculations before the airplane can take off This information is not generally retained after landing, however, because there is currently perceived no further need to do so. The same is true for the number of bags checked by each individual passenger, although important for the flight and the ensuing baggage-claim process, once all the luggage has been claimed or its presence otherwise accounted for, a record of this information is no longer maintained. And in many instances this information is only maintained at all simply by providing each passenger with a baggage claim check, rather than keeping a list in a central location.

For security reasons, as opposed to simply those necessary for baggage handling, each piece of luggage is sometimes matched with a passenger on the plane before it is actually loaded. This procedure is executed based on the belief that a passenger traveling on an airplane is far less inclined, in view of their own safety, to check bags containing hazardous materials that may (or may even be intended to) damage or destroy the plane in flight. While recent events have revealed that this belief is not universally true, the bag matching procedure is still considered prudent and is often being required by regulatory bodies. Again, however, this 'information' is often not retained beyond the flight in question absent some extraordinary reason for doing so.

As an added security measure, passengers checking baggage are often queried as to whether anyone else has given them something to carry onto the flight, or whether the opportunity for surreptitiously doing so might have arisen. There is typically no permanent record of this—or really any meaningful record except in the negative sense. That is, passenger responses arousing suspicion may lead to a further investigation or even denial of boarding of which there may be a permanent record, and any absence of such a record probably indicates that the passenger was allowed to proceed, and to check any luggage in their possession. On relatively infrequent occasions, the luggage of a person otherwise not arousing suspicion may be thoroughly examined. The frequency of such examinations rises when misbehavior is anticipated, or immediately following some sort of violent attack, but the more intensive searches are not as frequent when no such circumstances exist.

The benefits to more comprehensive tracking and management are several. First and foremost, collecting and retaining more information about each bag will provide a way for the airlines and the federal government to monitor for trips to locations that in and of themselves, or in combination with other trips give rise to suspicion concerning the carrying passenger's activities. Second, it provides an efficient way to track down luggage that has been misdirected and have it promptly returned to its rightful owner. Third, passengers more confident in the baggage-checking system may be more predisposed to check luggage rather than attempt to carry everything with them on board, relieving to some extent the problem of cabin congestion. Overall, air travel will become a more safe and worry-free experience for travelers, presumably with an attendant boost in ridership. The present invention provides a system and method for item management that in its various embodiments will provide some or all of these advantages.

SUMMARY OF THE INVENTION

The present invention provides a way to track and manage items and information related to them. In one aspect, the invention is a item tracking and management system including a central registration server and associated database. Marking tags, which may be for example RFIDs, bar coded tags, pictures, or machine-readable symbols, are issued for and affixed to each item. At the time of issue, information about the item itself and about its owner is collected and stored in the registration database. Management of the items begins when they are presented at a check-in station in communication with the registration server and continues indefinitely. The check-in station includes means for reading the marker tags to extract information from them, and to collect information about the person checking them. This information is forwarded to the central registration server for analysis and for storage on the registration database. This information may be stored on a database local to the check-in station as well. A check-out station may be provided to monitor items leaving active management and return to their owners. The check-out station may read the marker tags on each retrieved item and attempt to ensure that the item is being claimed by the proper party. A lost-item return station in communication with the registration server may be provided as well for aiding in the recovery and return of lost items. The lost-item return may also be used to arrange for items that are to be delivered to third parties regardless of whether they are lost. The registration server may be accessible to the general public through a firewall protected connection, so that an item's owner may be permitted to access selected information stored on the registration database. Third parties may be given lied access as well.

In another aspect, the present invention is a method of tracking and managing items including the steps of issuing marker tags to be affixed to each item, accepting the marked items at a check-in station where the tags are read, and forwarding the information collected to a central registration database. The method may also include the steps of retrieving selected information from the database and using it to compile a security profile, which can then be compared to predefined models. If a particular model is matched, for example a profile indicating travel to a nation known for terrorist activity, then the appropriate security agency is notified and further action may be taken. The information may also be used to delivery items to third parties or to retrieve lost items. The information, or selected portions of it, may also be forwarded to other systems for their use. The information may also be used to compile trend or analysis reports to third parties.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF A PREFERRED EMBODIMENT

Figure 1:
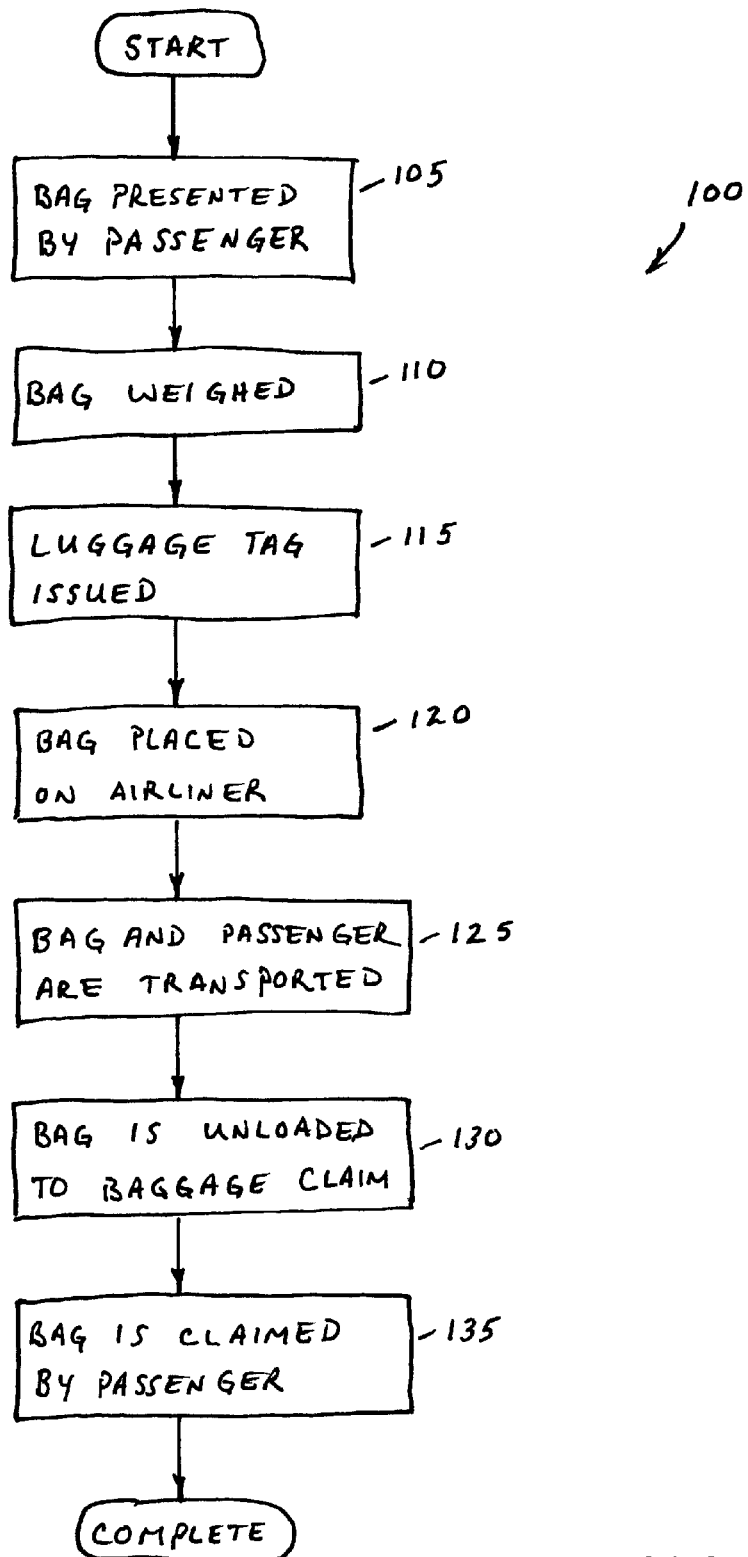
FIG. 1 is a simplified flow diagram illustrating the basic process through which an item, in this case a piece of airline passenger luggage, is transported from one location to another.

The present invention is directed to a system and an associated method for managing items. The greatest advantage of the present invention obtains in situations where there are a large number of movable items or things to keep track of, for example in tracking the movement of commercial airline passenger baggage. While the invention will now be described in terms of such an embodiment, it should be apparent to one skilled in the art, in light of this Specification, that there are many other applications as well. The basic flow of an article of luggage carried by a passenger will now be described to place this embodiment of the invention in context. FIG. 1 is a simplified flow chart flow chart illustrating the basic process 100 through which an item, in this case a piece of airline passenger luggage, is transported from one location to another.

The process 100 starts when a bag is presented by a passenger, typically at a ticket counter or some auxiliary check-in point (step 105). Typically, the bag is then weighed (step 110) by an airline representative (employee or agent) and a luggage tag is issued (step 115). Issue of a luggage tag usually includes attaching a removable tag to the bag itself, and presenting the passenger with a claim check. The removable tag indicates the destination, and often includes some way to correlate it to the claim check. The checked bag is then taken to and placed on the airliner (step 120) for transportation along with the passenger to their destination (step 125). The luggage and the passenger typically travel on the same aircraft although that is not always the case. Not all flights are direct, but if a change of planes is necessary the luggage will normally be transferred by airline personnel with little or no passenger involvement (step not shown). Once at the destination, the bag is removed from the plane and taken to a baggage claim area (step 130) where it stays until claimed by the passenger (step 135). To claim a bag the passenger may simply look for it and remove it when it is found, or may have to present a claim check to an airline representative as proof of ownership. More than one bag may be checked by a passenger, of course, in which case the above process steps are simply repeated as appropriate.

Deviation from the process 100 described above may occur for a number of reasons. For example, a bag may be misplaced or inadvertently sent to the wrong city, or may even be stolen, and therefore not be at the proper baggage claim area when the passenger arrives. Or the passenger may be delayed or placed on an alternate flight. Whatever the reason, when a passenger is unable to claim one or more of their bags, they must contact the carrier and initiate an attempt to find it. Normally this involves orally reporting the lost article, or perhaps filling out a form describing it. In many instances, the bag is not 'lost' at all, but simply delayed in getting to its proper destination. In some cases, the airline will initiate the process of delivering the lost item to its owner, but this is not customary as they frequently have no way to both identify the luggage as belonging to a particular individual and to determine the individual's current whereabouts. If the bag is truly lost, perhaps inadvertently picked up by a stranger, the airline will have to await its return to their custody before the bag can be returned to its proper owner, or perhaps even before the airline is aware it is missing. While passengers may object to the burden imposed on them by the current system, they generally must accept it or face the prospect of not recovering their luggage at all.

Another disruption in the normal process 100 may occur when it becomes necessary for security reasons to match each piece of luggage being loaded onto a plane with a passenger who is boarding it. Matching is done on the theory that a person that will be riding on a plane is less likely to check something hazardous. This process may involve simply comparing a list of those who checked baggage with those who present boarding passes, or may involve the actual identification of baggage by passengers on an item by item basis before it is loaded. However effective this matching, it often presents an inconvenience and irritation to passengers.

When applied to the basic process 100 of FIG. 1, or to similar processes, the present invention helps to alleviate passenger inconvenience and promotes greater security. One such application is described with reference to FIG. 2.

Figure 2:
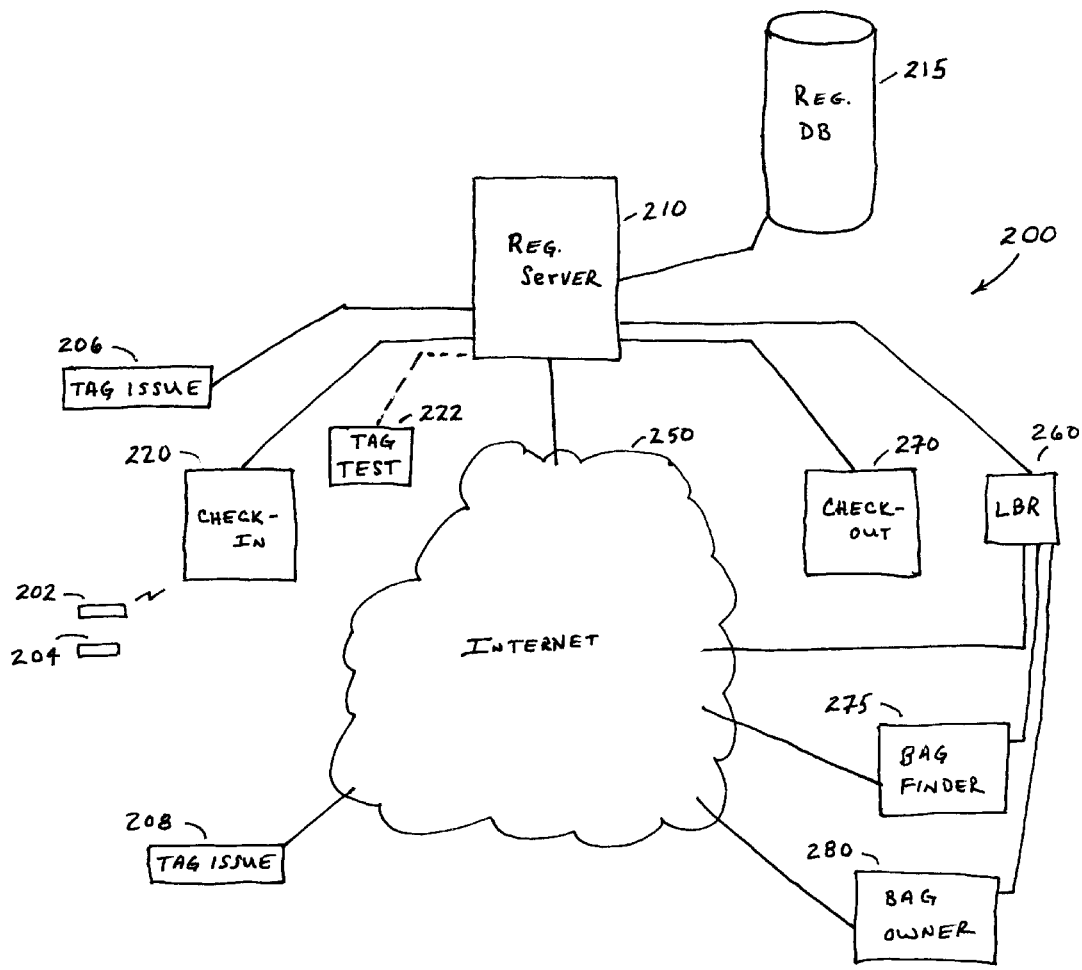
FIG. 2 is a functional block diagram of an item management system according to an embodiment of the present invention.

FIG. 2 is a functional block diagram of an electronic item management system 200 according to an embodiment of the present invention. A central registration database 215 maintains information relating to registered and, in some cases, unregistered articles. An article is registered when it is associated with a marking tag, such as RFID tags 202 and 204, shown in FIG. 2 (the luggage to which the tags may be attached is not shown). An RFID (radio-frequency ID) tag is one that is capable of transmitting to a reader (receiver) a uniquely encoded signal by which the tag is identified to the system at check-in, during handling, or at another appropriate time. Other types of marking tags may also be used, including bar-coded tags, or those with magnetic strips, presuming that an appropriate reader is to be available. Preferably, the tag also bears a number or other code recognizable to a human as well, in case the machine reader is unavailable or human confirmation is desired. The marking tag is obtained from an issuing authority and attached to an item of luggage in some fashion. In one embodiment, the RFID tag is permanently attached to the bag. In another embodiment, it is attached semi-permanently such that the tag can only be easily removed by the issuing authority. The issuing authority may be a government agency, a third-party operator, or the airline or airport itself. To promote widespread use, of course, the marking tags should be widely and easily available from the issuing authority, which may, for example be the government agency or the airline. In the embodiment of FIG. 2, tag issue station 206 is shown with a direct connection to registration server 210 and in this case is probably located at or near the airport itself. Tag issue station 208, on the other hand, may be located off-site and established its connection through the Internet 250. Tag issue stations 206 and 208 may be attended or automated, and should also provide a way for the person to whom the tag was issued, after properly establishing their identity to make allowable changes to the basic information stored on registration database 215 (for example, a change of address).

A wide variety of tags for use with the system may be used, some perhaps being temporary in nature, such as when a cardboard box is checked. Some or all of the basic information may be encoded on the tag itself, depending on its data storage capability. It may simply provide a distinctive code or number that can be used to retrieve information stored on the registration database 215, or it may bear a wealth of information. In addition, it may be an active or passive disseminator of information. A passive disseminator is simply "read" by a tag reader such as a bar code reader or image analyzer. An RFID tag, in contrast, may include a transmitter so that the stored information may actively be transmitted to a receiver associated with the check-in station 220 or some other location in the baggage handling process. In a preferred embodiment, for rapid processing the marking tag may even form a node on a communication network such as Internet 250, although this feature is not required.

Returning to the embodiment of FIG. 2, as previously mentioned, information related to the tagged luggage is stored on database 215, preferably having been collected when the marking tag is issued. This information will usually include at a minimum the name of the bag's owner, either an individual or an organization, and various contact information such as name and address, phone and fax number. It may also include other information, for example, a description of the bag, the identities of people who may be traveling with the luggage, and the forms of personal ID (passport, driver's license, and so forth) that they may be carrying. A description of the owner, or even a picture may also be stored in database 215. This stored picture could, for example, serve as personal ID in lieu of a driver's license, to prove bag ownership, or even as an identifying part of the marker tag itself One or more pictures or outlines of the bag may also be stored to provide a more positive basis for identification. The basic information will preferably also include luggage-owner preferences such as where and in what manner they should first be contacted, for example should the need arise to return a lost item that has been recovered.

When the basic information is collected, it is submitted to the registration database 215 through registration server 210. Registration server 210 handles communication with other system and non-system nodes and organizes the information in registration database 215 in a manner permitting efficient retrieval. Note that while the term "basic information" is used to generally describe static information relating to the luggage and its owner, it too is subject to change, for example when a bag is sold or given to another. Preferably the system can accommodate temporary changes in the basic information as well, such as when a particular luggage item is loaned for a three-month trip. At the end of the three months, the temporary information is archived, or simply discarded, and system resumes using the still-stored original information. Basic information is in contrast to historical information and security flags, discussed below.

Figure 3:
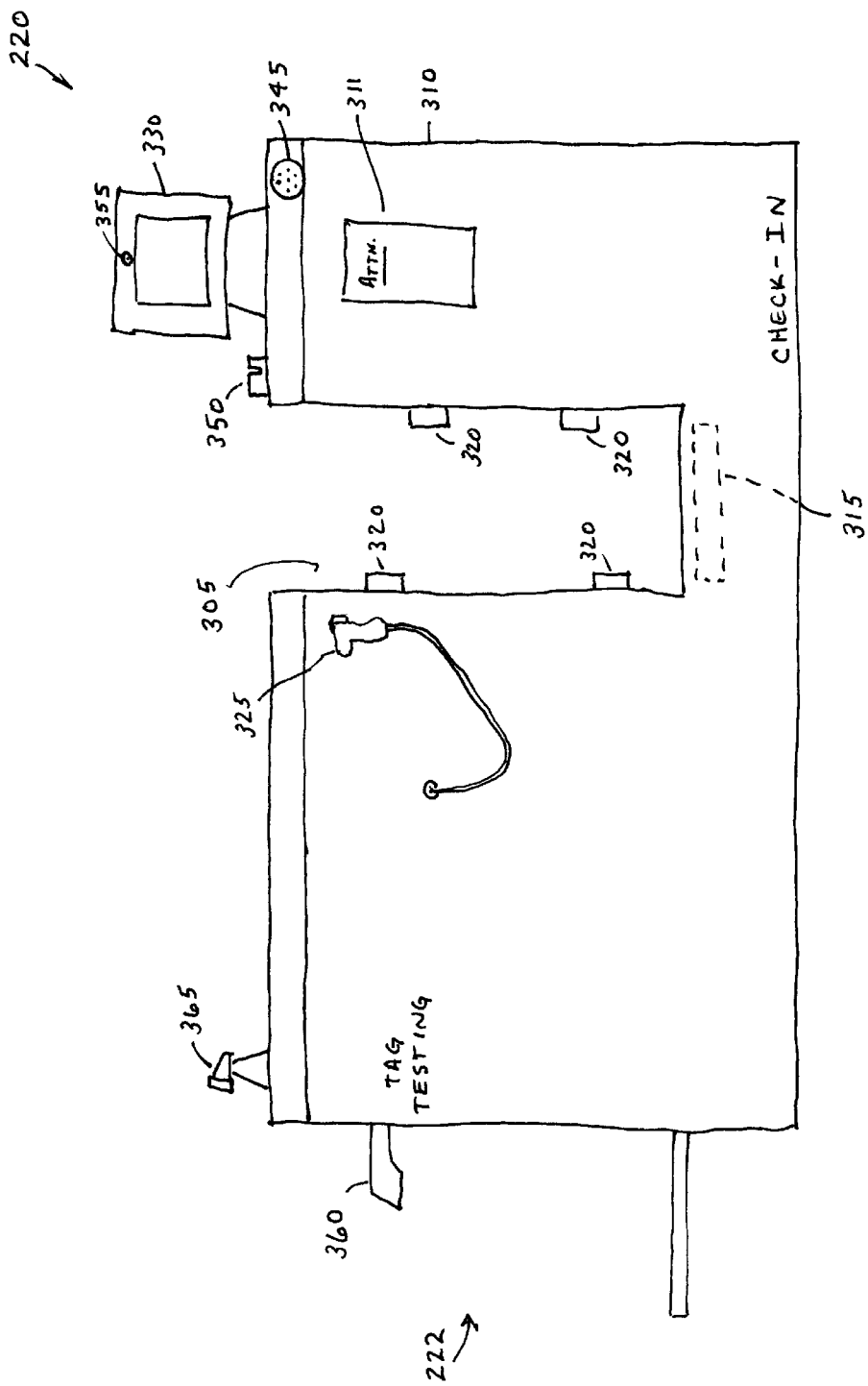
FIG. 3 is an illustration of the check-in station shown in FIG. 2.

When a passenger travels, they present their luggage at check-in station 220. The check-in station 220 is typically located at the airport, but may also be at a remote or even mobile station as well. Check-in station 220 includes a tag reader for reading marking tags such as RFID tag 202. When the tag is read, the information that it imparts is transmitted to registration server 210 for processing and storage in database 215. The connection between check-in station 210 and registration server is preferably by a dedicated high-speed line, although it could alternately (or as a backup) be established through a global communication network such as Internet 250. Preferably, registration server 210 is itself a node of Internet 250, and provided with firewall protection to prevent unauthorized access. Note that although only one check-in station is shown in FIG. 2, there are preferably a great number of them, and at least one at each major airport or other embarkation facility. In this way, registration database keeps, at a minimum, historical information relating to the presence of the bag (that is, its associated marking tag) on a certain date. (An exemplary check-in station is illustrated in FIG. 3.) Luggage travel-history information may be of great value from a security perspective; if for example a bag is being checked that has been to areas of the world that are known for supporting terrorist activity, there may be need for greater scrutiny. Preferably, of course, the check-in station also collects the identity of the luggage-checking passenger and their travel plans (ticket information or itinerary). This information is also transmitted to the registration server 210 for processing and storage.

The check-in station 220 is either fully automated, partially automated, or simply attended by a person who remains uninvolved in the process until needed. An 'attended' station may be personally attended or supervised from a physically separate facility through an audio and perhaps visual link. The degree of supervision available will often be a function of the resources available at a particular air terminal, the volume of traffic the station is expected to process, and the physical location of the station itself A check-in station located near a personally attended ticket counter, for example may require no additional human support. Typically, however, some involvement by security personnel is expected, especially where passengers must be queried as to whether they have packed and continuously controlled their own luggage. The answers to such questions and any other input (noting suspicious behavior, for example) from human supervisors is also entered and transmitted from the check-in station 220 to the registration server 210 for storage on registration database 215 and processing.

Any of the information provided to the registration server 210 that tends to indicate an above average level of security it required, either with respect to a specific item of luggage or a passenger, sets a security flag. When this occurs, a notification is sent to any location where the passenger or luggage item is detected. This may be, for example, at some point in the baggage handling process where the marking tag is read into the system or at passenger boarding when the passenger boards an aircraft. The security flag, of course, may have already been set at a previously visited location or by a central security agency. There may be one type of security flag or several, such as a low, medium, and high level of alert. The flag may include comments or annotation added by a security guard, or by the system itself using predefined commentary associated with particular events. Where present, these notes are stored on the registration database 215 and on a local database if appropriate. Flags and notes may be associated in the databases with particular bags, passengers, locations, and so forth, as is desired in the particular application. The exact procedure to be followed when notification of such a flag is received is a matter of policy, of course, but its use according to the present invention is intended to provide the maximum amount of information to those who will have to execute the policy. In a preferred embodiment, for example, when notification of a security flag is sent, the details of the particular incident causing the flag to be set is made available as well, either automatically or upon request. The other related information such as travel history will, of course, be available to requesting security personnel as well.

In one embodiment, the system also tracks passengers traveling without luggage, a fact that may be ascertained from a record of their boarding the plane but including no corresponding baggage check-in information. In this embodiment, the system keeps a passenger (as well as item) travel history and may set a security flag, for example, if a passenger who repeatedly travels with a group but checks no luggage then on one particular flight travels alone and checks several items.

When a passenger reaches their destination, the luggage is checked out of the system of at check-out station 270. The procedure used here may vary according to facility preference. Where, as is not uncommon, passengers may simply retrieve their luggage at a baggage claim area, each bag will be put through system check-out prior to placing in the claim area, or on the carousel or conveyor belt used there. The information that a bag has been so deposited is then transmitted to the registration server 210 for processing and storage in database 215. In more secure facilities, the check-out station is used by passengers on their way out of the baggage claim area, probably after presenting their baggage claims or personal ID to establish ownership. In one embodiment, a check-out station of this type may be incorporated in a portal through which passengers who have claimed their luggage must pass. A video camera near the portal captures an image of the passenger, which may then be compared, either by the system or by a human operator, to an image of the bag's owner that is stored on the registration database, a local database, or on the marking tag itself. However the passenger's identity is confirmed, when a passenger attempts to check out a bag that apparently does not belong to them, some type of alarm is sounded. Security personnel are typically present to deal with false alarms, and to ensure that no one attempts to bypass the system. Naturally, these security personnel may be provided with notification of security flags that have been set respecting any passengers or luggage leaving the claim area.

Note that baggage claim is the end of the typical existing item management and tracking process, discussed with reference to FIG. 1. The system and method according to the present invention, however, does not cease tracking at this point but rather continues to be useful after the flight and even on the next flight where the baggage is checked.

Those passengers disappointed at the baggage claim area, that is, those unable to find all of their luggage there, may resort to the lost baggage return (LBR) station 260 of item management system 200. In addition to providing greater security, the system and method of the present invention assists passengers and airline personnel in tracking down lost luggage. Again, although only one LBR station is shown in FIG. 2, there are preferably many, one or more being available near each baggage claim area. In one embodiment, the passenger approaching LBR station 260 is presented with an electronic claim form that can be filled out to provide their name, a description of the bag, and delivery instructions for use by the airline when the bag is found. Keeping in mind that much of this information may already be stored in the system, in another embodiment the passenger simply presents the baggage claim check to a station reader, and the electronic claim form is automatically (completely or partially) filled out, and the passenger given the option to change or supplement the information where appropriate. The search for the baggage may begin as soon as the passenger indicates the form has been completed. A lost luggage claim number and a hard copy of some or all of the information on the form may be provided for future reference.

Remembering that in a preferred embodiment, the lost bag's (in fact every bag's) arrival and departure, change of planes, inspection, and so forth have been noted by reading the marking tag, and a good deal of information may be known about the bag's whereabouts already. (And in one embodiment, the system will automatically initiate corrective action, or at least alarm if and when a bag is detected in the wrong area.) Although the airline or security agency may not wish to divulge some or all of this information immediately, in many cases the passenger will be allowed to view certain tracking information right at the LBR station 260. In any event, the passenger will be able to leave instructions on how and where to send notification when the bag is found, although again these instructions may have already been entered when the tag was registered and the passenger will simply select them by default, or enter new instructions, as desired.

The passenger may also be able to use a personal computer (PC), personal digital assistant (PDA), or similar device (designated generally as 280 in FIG. 2) in order to access information on the registration database. A cellular phone able to download Web pages, or at least limited versions of Web pages, could also be used. In an one alternate embodiment of the present invention, the user may also be able to call on a conventional cellular or wireline telephone and be presented with a series spoken menu choices from which to chose options by pressing a key associated with a particular choice. By selecting the correct options, and perhaps supplying lost-baggage claim number or a password, PIN, or other form of identification, the caller would be able to obtain certain information about a lost bag or provide instructions for its return. Similarly, using a device 275 capable of network communication, the finder of a lost item may access the system to receive instructions for returning the item.

FIG. 3 is an illustration of a check-in station 220 according to an embodiment of the present invention. In this embodiment, check-in station 220 is designed to accommodate the checking of baggage by airline passengers. Other designs may be more useful for checking different types of items in other contexts. Again, check-in station 220 may be staffed by a human representative or fully automatic. Check-in station 220 includes receptacle 305 formed in counter 310 for receiving each bag as it is checked. While receptacle 305 in FIG. 3 is an open design, it may alternately be constructed to facilitate the automatic removal of a checked item, and may as well feature a door that closes and locks to prevent tampering during the check-in process or removal of items that have been checked, at least until some de-checking procedure has been executed. (For clarity, these security features are not shown in FIG. 3.)

At the bottom of receptacle 305 is scale 315 for weighing in baggage as it is checked. One or more marking tag readers 320 are also located about the perimeter of receptacle 305. While a single reader 320 may be adequate, several will help ensure that the bag does not frequently have to be re-positioned in order to obtain an accurate reading. Hand-held reading device 325 may also be available for use on marking tags that are difficult to position properly. As mentioned above, a variety of types of marking tags may be used in accordance with the system of the present invention, and readers 320 and 325 should be able to accommodate the type or types used.

Placard 311 on the front of counter 310 provides basic instructions that may be useful to users unfamiliar with the system. More complete interactive instructions are preferably available, however, at display terminal 330. Perhaps initiated by the weight of a bag on the scale, a series of instructions are displayed to guide each passenger through the check-in process and, the instructions being tailored to the specific situation. Check-in instructions or other information may also be provided through speaker 345, which may also used in conjunction with microphone 355 to converse with a live operator when necessary. The passenger may use card reader 350 for scanning, that is, reading information stored on, an ID card, driver's license, passport, frequent flyer card, credit card, or even a boarding pass as is necessary for the particular check-in procedure in place that a given facility.

Note again that this check-in station configuration is meant to be exemplary, and not all of the features identified need to be present for correct operation. Components not shown, such as a security camera, fingerprint or retinal scan reader, marking tag dispenser or vending machine, and printer may also be useful. Although shown separately in FIG. 2, testing station 222 is here in the embodiment of FIG. 3 positioned at the end of counter 310 of check-in station 220. This provides a convenient way for passengers to make sure their marking tags are readable before entering what may be a significant check-in queue. The passenger simply positions the bag so that reader 360 is able to read the marking tag, and waits for indicator 365 to reveal whether the tag is valid. Indicator 365 may include only a red and green light, or may be a display terminal similar to display terminal 330. Some means of providing instructions to passengers is preferred here as well, letting passengers know where to get a marking tag if one could not be detected, or letting them know if the system accepts non-registered bags, or simply telling them to proceed to the actual check-in station. Although the testing station 222 (optionally connected to server 210 as shown by the broken line in FIG. 2) may also be used to check in bags, its purpose would be defeated if passengers were permitted to perform so many tasks there as to frustrate the efficiency of having a separate testing station. Finally, note that more detail relating to stations for checking items is presented in U.S. Pat. Ser. No. 6,010,239, entitled AUTOMATIC ITEM-DRIVEN SYSTEM FOR DEPOSIT AND PICK-UP, which issued on Jan. 4, 2000, and is incorporated herein by reference.

The LBR station 260 (shown in FIG. 2) may be similar to check-in station 220 in construction, allowing passengers that are unable to find one or more piece of luggage to begin the process of trying to find it. The check-in station 220 may even be used for this purpose as well, providing that this will not result in undue congestion and its location is convenient for both arriving and departing passengers. This may well be the case in smaller facilities, though in larger airports check-in stations and LBR stations will almost certainly be separately located. More advantageously, the LBR station may also function as a testing station 222. The LBR station preferably has a receptacle for luggage, however, and a marking tag reader so that recovered bags may be "checked-in" there. For example, terminal employees may insert unclaimed luggage, allowing the tags to be read. Of course, they will indicate in some way that the bag is being checked because it has not yet been recovered by its owner. A person that is returning a bag that they mistakenly thought was theirs may use the LBR station in the same way. If 'lost' baggage is received at LBR station 260, it is preferred that some means of providing secure storage is available, possibly including a cart, conveyor belt, or similar apparatus to remove from the public area luggage that has been checked in as lost. Alternately, an attendant may be paged when such an event occurs, or the LBR station 260 may provide instructions requesting that the found bag be taken to a specified location. As with the baggage being checked in for departing passengers, the now-known location of the recovered bag being deposited at LBR station 260 is transmitted to the registration database.

Figure 4:
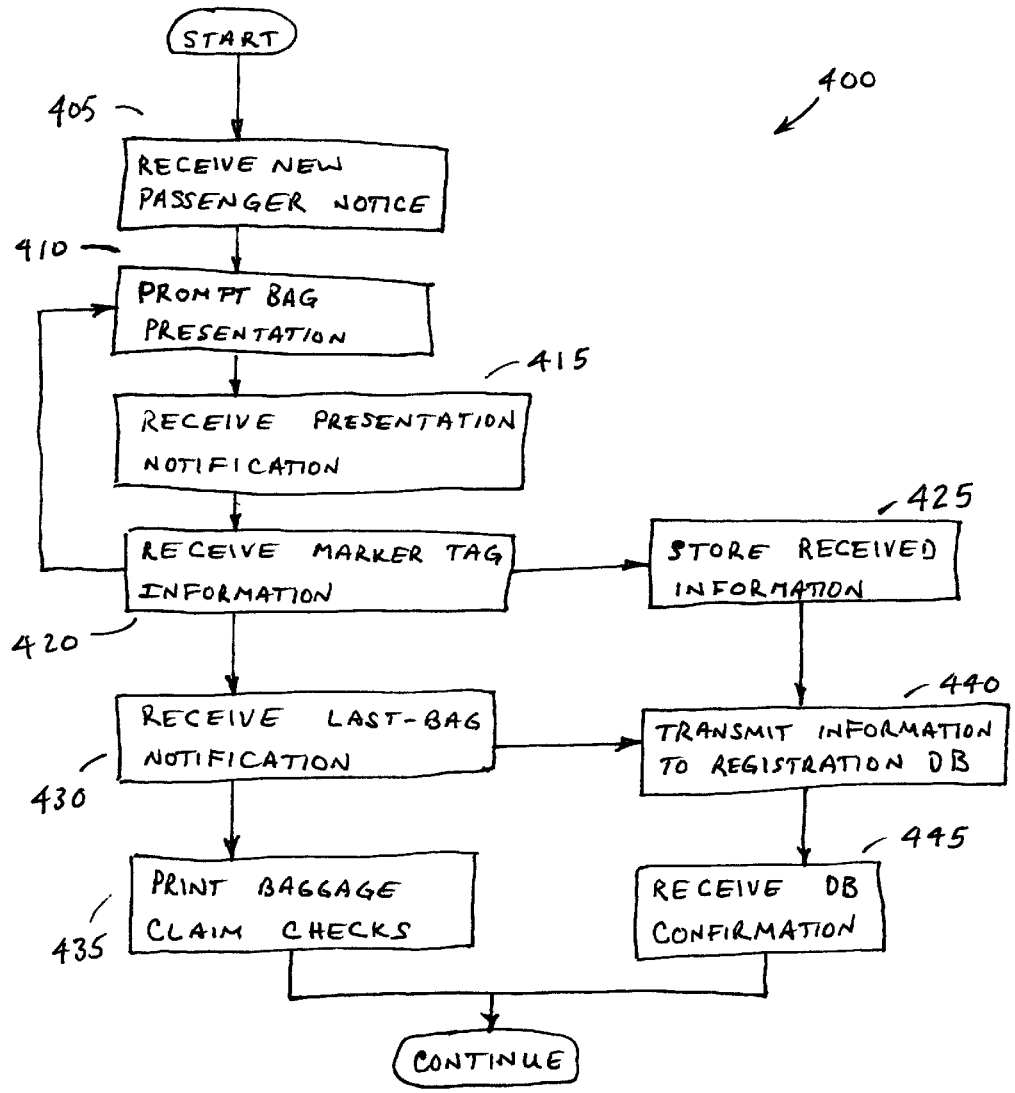
FIG. 4 is a flow diagram illustrating a method of tracking items in accordance with an embodiment of the present invention.

FIG. 4 is a flow diagram illustrating a method 400 of tracking a number of items, in this instance the luggage belonging to a single airline passenger, according to one embodiment of the present invention. At START it is presumed that an item registration database has been set up according to the parameters set forth above. At least one checking terminal is in communication with the database, as is one display terminal. Although a minimal system is thus described, the advantages of the present invention will best obtain where a large number of such devices are in communication with the registration database 215. As used herein, a minimal system will be referred to as limited or small scale. A comprehensive system, by contrast will be much larger and intended to substantially cover an entire group. Such a group might be defined, for example by citizenship and include all passengers traveling on a foreign passport. Other definitional criteria may, of course, be used as well. A universal system is one that attempts to cover substantially all items in the environment for which it is intended, such as all one for tracking the baggage of all commercial airline passengers. Note that the system and method of the present invention may be advantageously employed at any of the levels described above, providing either a universal or a limited database of information. Naturally, it may be preferred to employ it in limited fashion at first, with the scope increasing from time to time to include larger groups of passengers.

Whatever the scale, however, the method 400 begins when the passenger arrives with luggage to be carried on the flight. In the illustrated embodiment, the system receives a "new passenger" notice, typically initiated by a triggering event at the checking terminal (step 405). The checking process may be accomplished by a airline or airport employee, or may be done by the passenger acting alone. The triggering event may simply be pushing an button or touching a video-screen location, or may be the presentation of a ticket, personal ID card, or task card. Task cards may be used in instances where the normal check-in process is deviated from, for example to accommodate the checking in of security personnel and their luggage. In this case, a task card may be employed for them to present at a check-in station. In addition to identifying them as security personnel, the task card, similar to a marking tag but may be carried on the person, contains instructions detailing the special procedure to be followed. Using a task card, security personnel may be able to, when desirable, go through the check-in process without alerting the public at large of their security function.

Note that the management system will generally track only checked luggage, as carry-on luggage is too mutable. That is, items in one bag may easily be transferred to another within the secure area. Moreover, many carry-on items are actually acquired in the secure area such as purchased gifts or food items. There is generally a lesser need to track carry-on items anyway, as they are subject to more intense security inspection and do not usually become the responsibility of the airline. In some circumstances, however, tracking of carry-on luggage may be desirable, such as where the passenger wishes to participate in a voluntary lost item return service, or to provide a way to immediately link an item to a passenger, for example as they are passing through a security check point.

When the system receives the new-passenger notice, it will prompt the passenger to present a bag for checking (step 410), indicating it is ready to proceed. This prompt may be an audio or video instruction or may simply be a tone, followed perhaps by more detailed instructions if an undue delay indicates the passenger is not familiar with the system. Presumably, the passenger will then present an item, such as by placing it on a designated platform. Preferably, the system then receives an indication by a platform sensor that a bag has been presented (step 415). At the same time, it should also receive information from reading the marker tag on the bag (step 420). If it does not, it prompts the user to try again or, after several repeated failures to seek assistance in obtaining a proper tag (step not shown). In a preferred embodiment, a separate testing station is provided for passengers to verify that their luggage bears proper and functioning marking tags. If the testing station is associated with a tag-issuing authority, bags not having a properly functioning tag may be provided with one. Tests performed by passengers at such a testing station (such as testing station 222 shown in FIG. 3) will not normally be tracked in the database, but it may be desirable to have the capability to do so, perhaps for use during times of heightened security.

Returning to the embodiment of FIG. 4, after a bag has been received at step 420, the method returns to step 410 and issues another prompt. It will continue to do so until it receives a "last bag" signal (step 430) indicating that the passenger has no more luggage to present. This notice may be passenger or attendant initiated, or may be automatically generated when no additional bag has been placed on the platform for a given duration, for example 20 seconds. Following receipt of the "last bag" signal at step 430, the system may generate a confirmation request and await confirmation (steps not shown) to ensure the passenger is indeed finished.

In the illustrated embodiment, as each bag is checked, that is as the marking tags are read, the information gleaned from the marker tags is stored (step 425) in a local database. This local database (not shown) may be located at the check-in station 220 itself or at some other place in the same facility. It may, of course, handle data from many stations. The information stored there may include merely a tag identifying number recognizable to the system, but may also include a wealth of other information as well. For example, the marking tag may carry descriptive information, or even a picture of the bag or the owner, in which case an image may also be captured by a camera located at the check-in station so that a comparison may be made (step not shown). The failure of a bag to conform in appearance to the description stored on its tag may result in a security flag being associated with it. In lieu of a picture or description, the passenger may be required to enter a personal ID number (PIN) to confirm that the luggage being checked does in fact belong to them. As mentioned above, the marking tag may also contain, or even be an active disseminator of instructions, and where present, these instructions are stored as well. In an alternate embodiment, bags not equipped with marking tags are checked anyway, but only after certain security measures have been taken. For example, a picture of the passenger and the bag may be taken, digitized, and stored. A temporary marker tag may be issued at this point as well (steps not shown).

The process of FIG. 4 continues for each passenger bag until the last-bag signal (step 430) is received, and baggage claim tickets (if used) are issued (step 435). The claim checks may, of course, alternately be issued as each bag is checked. The information relating to this particular passenger is then transmitted (step 440) to the registration server 210 for storage and processing. The information sent to the registration database at this time may include all (or a select portion) of the information that has been taken from the marking tags themselves. In addition, it may include information from the environment monitors, such as the scale or check-in station video camera, or that collected (directly or indirectly) from the passenger. If multiple passengers are traveling together, the procedure 400 may be modified to accept luggage from each of them before collating and transmitting the information. Naturally, the fact that the passengers are traveling together is typically also recorded. In either case, once receipt and storage in the registration database has been confirmed (step 445), it may be deleted from the local database, or alternately retained for a predetermined period. The advantage of retaining the information locally for at least some period is that it may be easier to accommodate changes for example if flight plans are altered or if it becomes necessary to check rather than carry-on a particular item. Locally stored information can also be used for security purposes, such as identifying a particular passenger as a member of a certain travel group.

In some applications, of course, the information relating to a particular marking tag or passenger may be sent to the registration database as it is received (step not shown) instead of being stored locally. A local database is not required. There may be reason to transmit the information immediately even where a local database is provided. In one embodiment, for example, a listing of security criteria is periodically transmitted to local facilities, where it is accessible to the various check-in stations located there. When a listed passenger or bag is detected, related information can be immediately sent to the registration server along with a security flag. A security flag is simply a notice, message, datum, or setting to indicate that the item or passenger it is associated with may merit additional attention or scrutiny. The selected information may also be sent to local security personnel, who may then be able to monitor the check-in process in real time. Local security personnel may also be able to clear the security flag or flags that have been set if it turns out that a false alarm has occurred.

Some of the information collected at the check-in station is related to flight operations. This information may also be forwarded to a central airline database for use in airplane loading calculations, to track luggage as it is transported throughout the system, or for ancillary reasons such as logging frequent-flyer miles. As alluded to previously, some or all security information may be distributed to security personnel located at the departure airport, with selected information being forwarded to the various destination airports as appropriate. Of course, all of these functions will be in communication with the registration server, and may simply formulate appropriate requests for retrieving information from the registration database. This may be desirable in some instances as the registration database will usually have stored the most current information concerning specific bags, passengers, or security flags, and is available through the Internet as well as through dedicated communication channels. In a particularly preferred embodiment, numerous mirror databases are set up and maintained with registration information that is as close to current as possible to avoid undue delay in processing requests for information and as a backup against the possibility of one or more registration database sites becoming temporarily or permanently unavailable.

Figure 5:
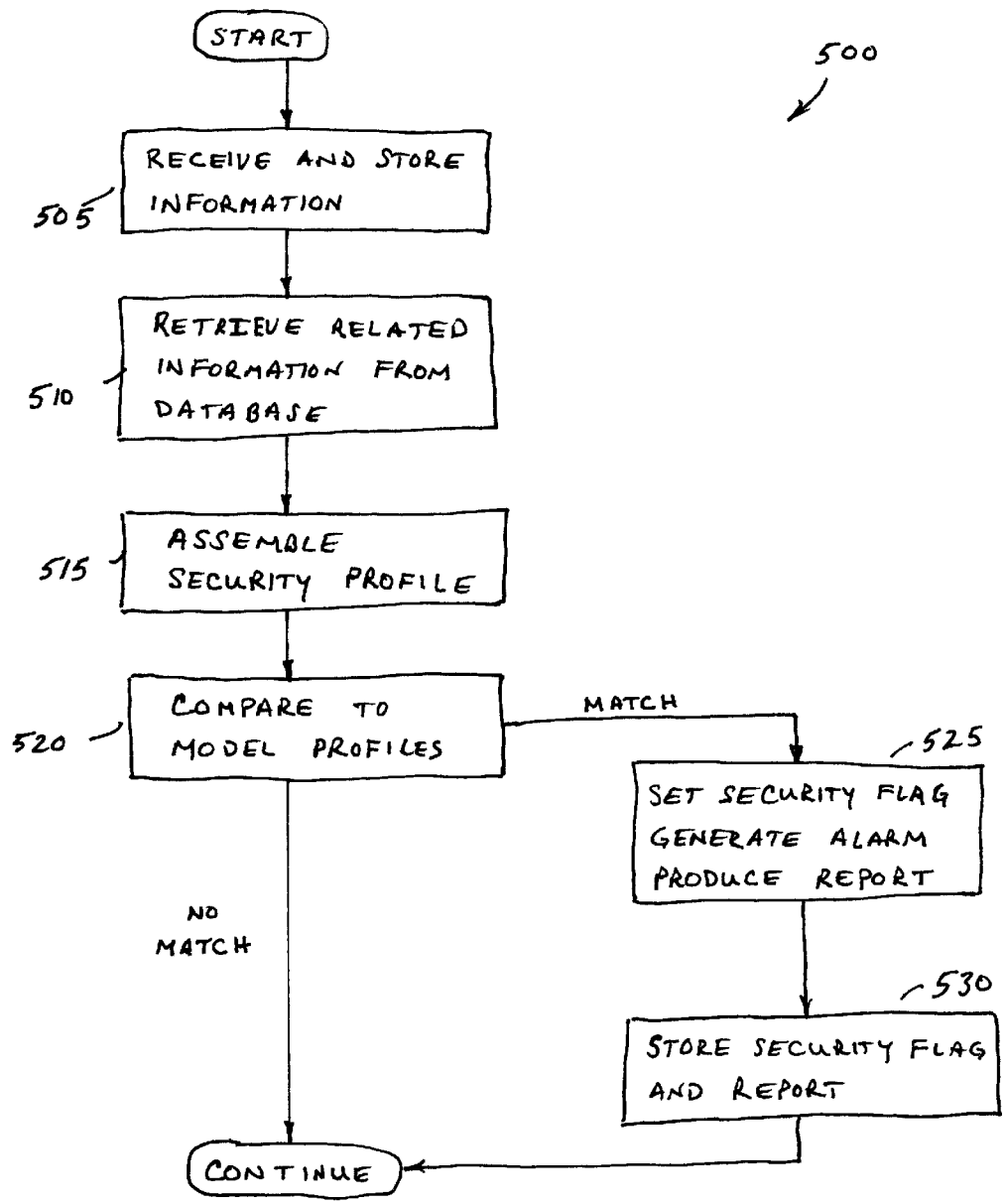
FIG. 5 is a flow diagram illustrating the a method of security profiling according to an embodiment of the present invention.

In accordance with an embodiment of the present invention, the information collected at the check-in station 220 and transmitted to the registration server 210 for storage on registration database 215 is also used for security purposes, as explained with reference to FIG. 5. FIG. 5 is a flow diagram illustrating the a method 500 of security profiling according to an embodiment of the present invention. At START, it is presumed that at least one check-in station is operable to collect and transmit information read from marking tags, and that registration database 215 has been populated with data relating to issued tags that may be presented at the check-in station 220. When information is received in the registration server 210, the server stores the information in the registration database 215 (step 505 in this process, corresponding with step 440 in FIG. 4). In addition, the registration server also retrieves (step 510) from the registration database information related to the items being checked, to the person checking them, or both. This information may include any data stored on the database but is likely to include the information stored when the marking tag was issued, where the bag has previously been checked or claimed and by whom, and any relevant security flags, notes or similar information. In one embodiment (not shown), the registration server also check with local databases to retrieve, if present, relevant information that has been stored there but not yet transmitted to the registration database.

When the relevant information has been retrieved, a security profile is assembled (step 515). The security profile is an assembly of selected information relating to an item of luggage, a passenger, or even a group of passengers, the information being organized according to a predetermined scheme. The security profile may include a marking-tag travel and security-flag history, which may prove valuable to security personnel. It may also indicate that the bag is being carried by a person not ordinary associated with it, and should point out any discrepancies, such as where the bag itself does not match the description stored in the registration database, perhaps indicating it has been removed from one bag and fixed to another. The security profile may also include notes relating to passenger behavior, including for example the type of luggage they are carrying and to what destinations. After it is assembled, the security profile is compared to one or more models (step 520) to determine if it matches a profile that coincides with certain undesirable activities. It should be pointed out that the security profile procedure may vary by location, and that the specific information retrieved and assembled added to the security profile will be determined by the appropriate security agency. These procedures will also change from time to time to adjust to new intelligence information and circumstances. In a sophisticated embodiment of the present invention, the item management system itself automatically adjusts the profile content, structure, and the models used for comparison.

Returning to the embodiment of FIG. 5, if the security profile does not match any of the models, the method 500 simply returns to START and awaits further input. If a match does occur, the system sets a security flag in the registration database 215, generates a notification alarm to alert the appropriate security personnel, and generates a match report (step 525). Note that the action taken when a security profile is matched will not necessarily include all of these activities. Other action may be taken as well, such as activating a video camera at the check-in station (or retrieving video already accumulated by one). Information relating to any such action taken may also be stored in the registration database (step 530) for future study or use in compiling profiles when the need arises. As should be apparent, the generation of such a profile may be triggered by events other than the checking of baggage, for example a flight attendant noticing unusual passenger behavior may request that a profile bearing on that passenger be generated for analysis.

In this way limited security forces may be efficiently and quickly brought to bear where they are most needed. Naturally, it is not normally practicable to generate a travel history for each checked bag, but where the history raises suspicion, an immediate notification may be sent to the appropriate security office or offices. The bag, for example, may have made one or more trips to an antagonistic country or been somewhere at the time of a known clandestine meeting. Or the bag may have in the past raised a number of security flags in the past even though present circumstances are unremarkable. Tracking the bag as well as the passenger carrying it presents several advantages, one being that its travel history and other information may be examined independent of the passenger or owner. This may avoid misinterpretations arising from the appearance of the passenger, and also avoid accusations that certain types of passengers are being singled out for greater scrutiny.

Figure 6:
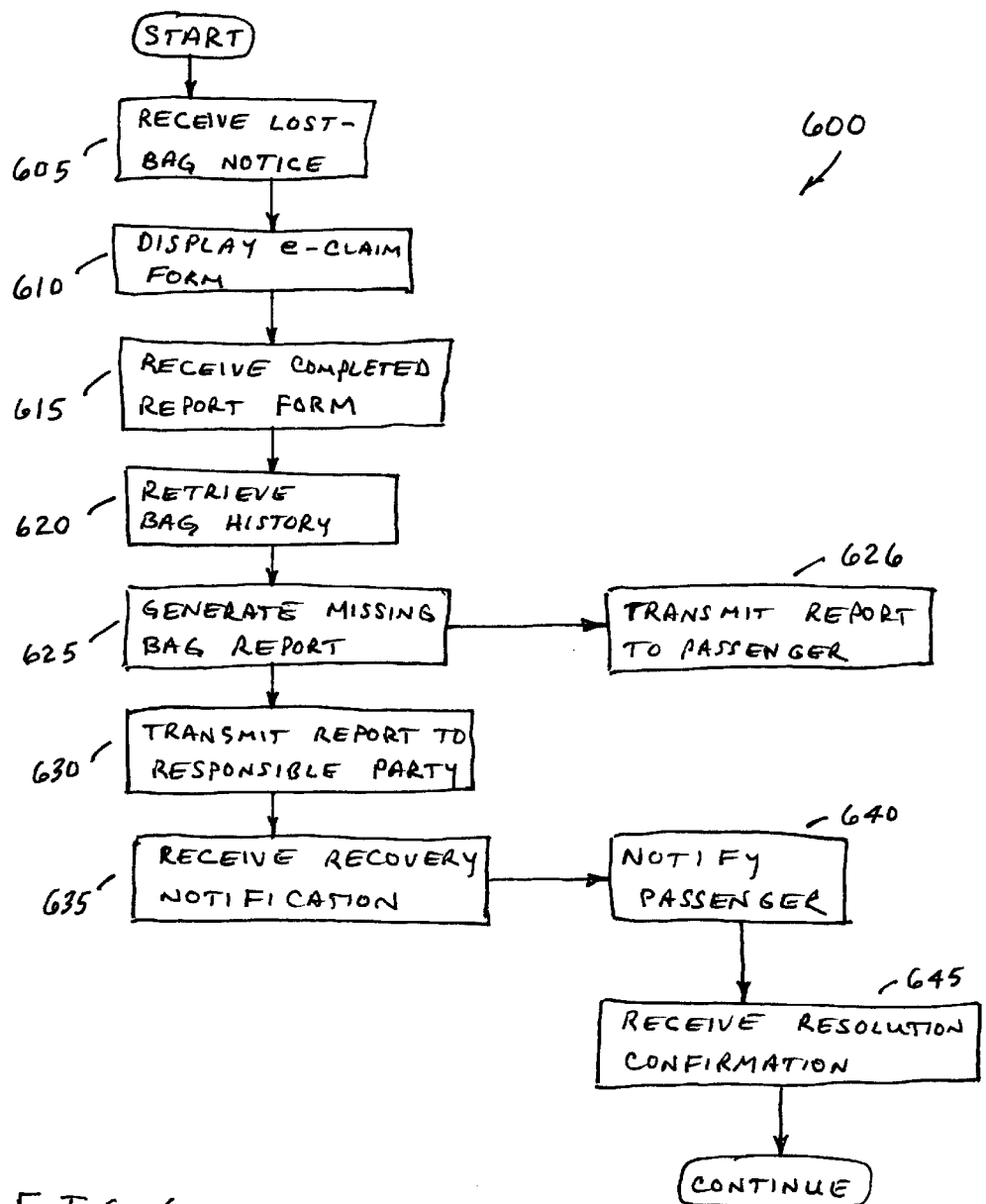
FIG. 6 is a flow diagram illustrating the a method of handling a lost item incident according to an embodiment of the present invention

As mentioned previously, the system of the present invention may also be used to assist in the recovery and return of lost baggage. FIG. 6 is a flow diagram illustrating a method 600 of handling a lost item incident according to an embodiment of the present invention. At START it is presumed that a passenger is unable to reclaim an item of luggage at their destination, and that in some manner the registration database has been populated with information relating to the marking tag-associated with the missing item. (It is not a requirement that all of this information have been entered flawlessly, however; the method is still of assistance for finding luggage where this is not the case.) The process begins when the system receives a notice that an article of luggage cannot be found (step 605). This will typically occur when a disappointed passenger enters an indication at an LBR 260 (see FIG. 2). If permitted to do so, the passenger may also enter the information from their own computer by visiting a specified Web site. The passenger may be required to enter some form of identification at this time, from which the system will be able to verify that they are in fact a passenger (step not shown). While the identification may be entered later, if there is any flight or passenger specific information available, it may be passed along to avoid or delay the trouble of proceeding, if possible. For example, a passenger presenting a boarding pass or claim check may be notified that unloading of their plane is still in progress, and that they should look for their luggage again in baggage claim, perhaps after a specified wait time. As another example, a passenger may be alerted that the airline is already aware of problems with delivery, such as a security detention or missed connection, and provide instructions suggesting how the passenger should proceed.

In other cases, however, the method proceeds with step 610, displaying an electronic claim form at a display terminal associated with LBR 260. The form will require that the lost item be specified, inquire as to specific delivery and contact instructions, and gather any other passenger comments relating to the incident. Note that as presented to the passenger, the form may be at least partially filled out, the already inserted information having been retrieved from the registration database 215 based on a presented claim form, boarding pass, or other ID. Alternately, the LBR 260 will request that in order to begin, the passenger's name should be entered, and armed with this information the relevant data may be found. The passenger may similarly be presented with choices, such as where all of their checked luggage is listed for them to specify which item or items are missing. The passenger may also simply be asked to confirm delivery instructions specified when the marking tag associated with the missing bag was obtained. However it is filled out, the passenger simply indicates when they are done, and the form is submitted.

When the system receives the completed electronic claim form (step 615), it proceeds to retrieve selected historical information related to the missing bag, as well as a description or picture (step 620). A missing bag report can then be generated (step 625). At this time, an incident identification number may be assigned (step not shown) for future reference. The report may be in electronic or printed form, and is transmitted in an appropriate manner to the person or group having responsibility for lost baggage recovery (step 630). The report preferably includes a description of the bag, its last-known whereabouts, and instructions for how to effect its return. A copy of the report, perhaps in abbreviated form, may also be sent or provided to the passenger (step 626), who will at least be given the incident number. The airline in some instances may be hesitant to disclose fill information concerning the bag, perhaps where it was retained by security for a time but then released, or perhaps because it was mis-routed and the airline would prefer to give only an estimated time of arrival rather than a full explanation. Where information is made available to the passenger, they may be allowed to retrieve current information by contacting the airlines Web site.

When notification is received that the bag has been located (step 635), the passenger is sent a notification (step 640) according to the instructions on the claim form. For example, the passenger may be called or sent an email. The notification will normally request that delivery instructions be confirmed, and delivery may be performed as soon as a confirmation has been received (step 645). Note that while in this embodiment the system is directed primarily to returning lost baggage to its rightful owner, it could easily be adapted in an alternate embodiment (not shown) for allowing properly checked bags to be delivered to some prearranged location or third party. In this instance outside delivery services may also be used, and provided with limited access to the information in the registration database 215 as needed to effect delivery.

The applications for the information collected by the item management system of the present invention are not limited, of course, to the item management system itself For example, subject to security and privacy concerns, the information relating to travel patterns, especially if combined with demographic information, may enable the generation of reports showing travel habits and trends. The demographic information could be collected as part of the process of issuing the marker tags, checking in passengers, or simply by voluntary questioning. The reports (typically less personal or identifying information) could actually be sold and provide a way of recouping some of the cost of the system.

Based on the foregoing description, one of ordinary skill in the art should readily appreciate that the present invention advantageously provides an item management and tracking system available through an electronic communications network. It is believed that the operation of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A system for tracking items such as passenger baggage, said system comprising:

a registration database for storing information relating to the baggage;

a plurality of unique marker tags, each tag to be associated with and fixedly attached to a bag, whereas the marker tag bears information relating to the bag to which it is attached;

a plurality of tag readers in communication with the database for reading the information borne on the marker tags and transmitting it for storage in the database, the plurality of tag readers including at least one check-in station located at a passenger terminal; and a registration server in communication with the tag readers and with the registration database for receiving information from the tag reader and storing it in the registration database;

wherein at least a portion of the information stored on the registration database is maintained so as to be accessible during at least one future presentation of the bag at a check-in station.

2. The system of claim 1, wherein at least a portion of the information least of the information stored on the registration database is accessible to the public through a communication network such as the Internet.

3. The system of claim 1, further comprising a testing station for determining whether a marking tag is properly scannable prior to check-in of the bag associated with it.

4. The system of claim 1, further comprising the step of performing a security analysis of the information stored on the registration database that relates to the at least one bag, the security analysis including the comparison of the stored information to predefined security criteria.

5. The system of claim 1, further comprising a security analysis module for performing a security analysis of the information stored on the registration database relating to a plurality bags, the security analysis including the comparison of the stored information to predefined security criteria.

6. The system of claim 1, wherein the item-related information comprises a history of previous locations where the bag has been presented at a tag reader.

7. The system of claim 6, further comprising:
a security module accessible to the registration server for detecting when a tag reader has sent information relating to a specific bag and for retrieving at least a portion of the previously-stored information from the database that also relates to the specific bag.

8. The system of claim 7, wherein the security module sets a security flag associated with the specific bag when the information relating to the specific item matches a predetermined security criteria.

9. The item management and tracking system of claim 1, further comprising a lost bag return (LBR) facility for receiving a request that a notification be sent when the current location of a specified item has been determined.

10. The system of claim 9, further comprising a communications terminal in communication with the registration server for presenting an electronic claim form to be filled out by a person desiring notification of the finding of an item.

11. The system of claim 10, wherein the check-in station produces a claim check, and wherein the communications terminal further comprising a claim check reader such that at least a portion of the electronic claim form can be filled out by presenting the claim check to the claim check reader.

12. The system of claim 1, further comprising at least one check-out station located at a passenger terminal for tracking the baa's location as the passenger travels.

13. The system of claim 12, wherein the check-out station comprises a tag reader for reading the marking tags on items being retrieved.

14. The system of claim 1, wherein at least some of the marking tags are radio-frequency identification (RFID) tags.

15. The system of claim 14, wherein at least some of the RFID tags are active transmitters of information.

16. The system of claim 14, wherein at least some of the active RFID tags are nodes in the communication network.

17. A method for the management and tracking of items such as passenger baggage, comprising the steps of:
providing a registration database for storing information relating to the items baggage to be tracked;
marking at least one bag with a unique marking tag that bears identifying information;
storing in the registration database information associating the unique marking tag with its bag;
providing at a trip departure terminal a check-in station in communication with the registration database for reading the marking tags on bags presented at the check-in station prior to travel; and
maintaining information relating to the trip that can be referred to on at least one future occasion when the bag is presented at a check-in station.

18. The method for the management and tracking of items of claim 17, further comprising the step of maintaining in the registration database a historical record of occasions when the at least one bag has been presented for check-in.

19. The method for the management and tracking of items of claim 17, further comprising the step of performing a security analysis of the information stored on the registration database that relates to the at least one bag, the security analysis including the comparison of the stored information to predefined security criteria.

20. The method for the management and tracking of items of claim 17, further comprising the step of providing at least some of the information relating to the at least one bag presented at the check-in station to a system outside of the item management and tracking system.

21. The method for the management and tracking of items of claim 17, further comprising the step of performing a security analysis using information relating to a plurality of bags stored on the registration database to determine whether the information relating to the plurality of bags matches predefined security criteria.

22. The method for the management and tracking of items of claim 17, further providing at a trip arrival terminal a check-out station in communication with the registration database for reading marking tags on bags presented at the check-out station subsequent to travel.

23. The method for the management and tracking of items of claim 17, further comprising the step gathering at the check-in station additional information relating to the at least one bag, the additional information including information not borne on the marking tag.

24. The method for the management and tracking of items of claim 23, wherein the at least one bag presented at the check-in station is presented by a person and the additional information gathered includes identifying information relating to the person presenting the item for check-in.

25. The method for the management and tracking of items of claim 17, further comprising the step of providing a claim check items presented for checking at the check-in station.

26. The method for the management and tracking of items of claim 25, further comprising a lost baggage return (LBR) system for assisting passengers in the recovery of lost bags.

27. The method for the management and tracking of items of claim 26, wherein the LBR system includes an electronic baggage claim form on which a passenger may enter information for use by the airline in retrieving a lost bag.

28. The method for the management and tracking of items of claim 27, wherein the LBR system further includes a claim check reader.

29. A method for the management and tracking of items such as airline passenger baggage, comprising the steps of:
providing a registration database for storing information relating to the items to be tracked,
marking a plurality of items with marking tags that bear identifying information;
affixing a marking tag to an item to be tracked;
storing in the registration database information associating each affixed tag with information relating to the item to which it is affixed;
providing a check-in station in communication with the registration database for reading the marking tags affixed to items presented at the check-in station;

providing a claim check for each item that is presented for checking at the check-in station;

providing a lost item return (LIR) system for assisting in the recovery of lost items wherein the LIR system includes an electronic claim form on which information for use in retrieving the lost item may be entered, and where in the LIR system includes a claim check reader, such that at least some of the information on the electronic claim form may be entered by presenting a claim check to the claim check reader.

30. The method for the management and tracking of items of claim 29, wherein at least some of the information relating to the lost item from the registration database may be retrieved through the communication network.

31. The method for management and tracking of items of claim 29, wherein the LIR system includes an interface for contacting a delivery service to arrange for the delivery of an item to a pre-arranged location or third party.

* * * * *